(12) United States Patent
Gentile et al.

(10) Patent No.: US 8,712,655 B2
(45) Date of Patent: Apr. 29, 2014

(54) CONTROL SYSTEM FOR SHIFTING AN AUTOMATIC TRANSMISSION

(71) Applicant: GM Global Technology Operations LLC, Detroit, MI (US)

(72) Inventors: Martin Gentile, Ruesselsheim-Koenigstaedten (DE); Gernot Becker, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/624,031

(22) Filed: Sep. 21, 2012

(65) Prior Publication Data
US 2013/0085648 A1    Apr. 4, 2013

(30) Foreign Application Priority Data

Sep. 23, 2011    (DE) .......................... 10 2011 114 261

(51) Int. Cl.
*G06F 19/00*    (2011.01)

(52) U.S. Cl.
USPC ............... 701/60; 701/55; 701/70; 701/94; 528/272; 528/296; 528/298; 528/299; 528/302; 475/82; 475/275; 264/176.1; 53/116

(58) Field of Classification Search
USPC .......................................... 701/55, 60, 70, 95
See application file for complete search history.

(56) References Cited

U.S. PATENT DOCUMENTS

| 5,003,482 | A | * | 3/1991 | Teratani et al. .................. 701/95 |
| 5,345,843 | A | * | 9/1994 | Fujita et al. .................... 477/98 |
| 6,216,073 | B1 | | 4/2001 | Horiguchi et al. |
| 6,554,741 | B2 | * | 4/2003 | Saito ............................. 477/120 |
| 6,856,868 | B1 | * | 2/2005 | Le et al. .......................... 701/38 |
| 7,739,017 | B2 | | 6/2010 | Pfisterer et al. |
| 8,086,379 | B2 | | 12/2011 | Sugiura et al. |
| 8,133,154 | B2 | | 3/2012 | Tao et al. |
| 8,190,339 | B2 | * | 5/2012 | Sato et al. ....................... 701/55 |
| 2007/0032341 | A1 | * | 2/2007 | Shiiba et al. .................. 477/109 |
| 2009/0171543 | A1 | * | 7/2009 | Sato et al. ....................... 701/55 |
| 2009/0287385 | A1 | | 11/2009 | Pfisterer et al. |
| 2012/0296541 | A1 | * | 11/2012 | Matsushita et al. ............. 701/70 |

OTHER PUBLICATIONS

German Patent Office, German Search Report for Application No. 102011114261.8, dated Jan. 26, 2012.

* cited by examiner

*Primary Examiner* — McDieunel Marc

(74) *Attorney, Agent, or Firm* — Ingrassia Fisher & Lorenz, P.C.

(57) ABSTRACT

A control system is provided for shifting an automatic transmission of a motor vehicle, which includes, but is not limited to a speed controller, and an electronic control device. Through the electronic control device the parameters vehicle speed, position of the speed controller and acceleration of the speed controller can be captured. Through the electronic control device and through comparison of the captured values of the parameters with predetermined reference values a shifting time is determined for shifting the automatic transmission.

8 Claims, 3 Drawing Sheets

16

14

12

CONTROL SYSTEM FOR SHIFTING AN AUTOMATIC TRANSMISSION

CROSS-REFERENCE TO RELATED APPLICATION

This application claims priority to German Patent Application No. 10 2011 114 261.8, filed Sep. 23, 2011, which is incorporated herein by reference in its entirety.

TECHNICAL FIELD

This technical field relates to a control system for shifting an automatic transmission of a motor vehicle, in particular for downshifting an automatic transmission.

BACKGROUND

An automatic transmission is not a normal manual transmission. The control of the clutch and the change of the gear are not brought about by the driver, but for example by actuators or hydraulics. During the gear change, the torque transmission, exactly with conventional manual transmissions, is interrupted, and the shifting time is determined by the time of the gear change plus the time for the clutch actuation. A driver can select a gear to be engaged without having to manually carry out the clutch operation.

The changing of the gears with an automatic transmission in this case can be carried out with the help of a shifting curve, which has been generated as a function of a position of a speed controller and of a vehicle speed. The term speed controller describes a controller, which controls the power of the engine. The speed controller can be designed for example in the form of a rotary knob, of a lever, a touch-sensitive area or of an accelerator pedal. For example, upon a slow actuation of the speed controller of the motor vehicle in order to for example to allow the motor vehicle to roll out to a stop, the automatic transmission can react unevenly, for example nervously or aggressively, which can manifest itself for example as a jerking of the motor vehicle or as a loud engine noise.

In view of the foregoing, at least one object is to make available a control system for shifting, in particular for downshifting an automatic transmission for motor vehicles, which makes possible increased comfort during driving during the changing of the gears in an automatic transmission. In addition, other objects, desirable features and characteristics will become apparent from the subsequent summary and detailed description, and the appended claims, taken in conjunction with the accompanying drawings and this background.

SUMMARY

An embodiment relates to a control system for shifting, in particular for downshifting an automatic transmission of a motor vehicle, comprising a speed controller, an electronic control device. Through the electronic control device the parameters of vehicle speed, position of the speed controller and accelerator of the speed controller can be captured. Through the electronic control device and through adjusting the captured values of the parameters with predetermined reference values a shifting time, in particular a shifting time for downshifting the automatic transmission can be determined.

The electronic control device can be connected to the speed controller and to the automatic transmission. The electronic control device can capture at different parameters. The values of the parameters can be captured directly through sensors connected to the electronic control device, or captured indirectly. The values during the indirect capture can be derived from further information. Here, the parameters can comprise a vehicle speed, a position of the speed controller and/or an acceleration of the speed controller. Here, the vehicle speed for example can be driven with a speed sensor or be derived from information, for example a rotational wheel speed. The position of the speed controller can be captured for example with the help of an angle sensor. The angle sensor for example can output a percentage value to the electronic control device. A value of approximately 0% can correspond to a zero position and a value of approximately 100% to a full load position of the speed controller. The acceleration of the speed controller can be captured for example with an acceleration sensor arranged on the speed controller.

In the electronic control device, reference values for shifting times can be stored for example in a storage element. The reference values, in particular the reference values from value triples of the vehicle speed, the position of the speed controller and the acceleration of the speed controller can be assigned to certain gear changes, for example from the sixth into the fifth gear or from the fourth into the second gear. In the predetermined reference values for shifting the automatic transmission, in particular for downshifting, it can be determined by how many gears the automatic transmission will shift at the assigned shifting time. For example, with a low or constant acceleration of the speed controller, a shifting time, in particular a shifting time for downshifting the automatic transmission can be determined, which engages the gears one after the other while with a high acceleration of the speed controller, for example a shifting time, in particular a shifting time for downshifting the automatic transmission can be determined, wherein one or a plurality of gears can be skipped. Here, the acceleration is the change of the speed with which the speed controller is actuated.

The captured values of the parameters can be continuously compared with predetermined reference values in the electronic control device. With the help of the reference values, shifting times of the automatic transmission, in particular shifting times for downshifting can be determined. As soon as the captured values of the parameters coincide with predetermined reference values, the shifting time of the automatic transmission can be determined through the electronic control device, wherein the automatic transmission can be shifted, in particular downshifted in accordance with the gear changes assigned to the reference values. Because of this, the control system can also skip gears during the shifting of an automatic transmission, as a result of which an uneven, for example a nervous or aggressive shifting behavior can be avoided through a rapid serial change of the individual gears. Because of this, the electronic control device can determine a shifting time, in particular a shifting time for downshifting the automatic transmission with a corresponding gear change, which can be adapted to the driving state of the motor vehicle. Because of this, an uneven, for example a nervous or aggressive shifting of the automatic transmission can be prevented, as a result of which the driving comfort can be increased.

Preferentially, the electronic control device is configured in such a manner that the electronic control device determines the acceleration of the speed controller as a function of a change of the position of the speed controller. Because of this, the electronic control device can capture the acceleration with which the speed controller is actuated, for example with an increasing, constant or decreasing acceleration. As a function of the acceleration and/or position of the speed controller, the electronic control device can indirectly calculate and/or derive the acceleration and/or change of the position of the speed controller. In conjunction with the parameters vehicle speed and position of the speed controller and by comparing with a predetermined reference value, the electronic control device can determine a shifting time with an assigned gear change of the automatic transmission. Through the indirect capturing of the acceleration, an acceleration sensor for example can be saved, as a result of which cost savings can be made possible.

A further embodiment is a motor vehicle having at least one control system for shifting, in particular for downshifting an automatic transmission for motor vehicles. Through the control system, the electronic control device of the control system can compare the captured parameters with predetermined reference values and determine a shifting time of the automatic transmission, and thus increase the driving comfort.

Furthermore, a method is claimed for controlling a shifting, in particular a downshifting of an automatic transmission of a motor vehicle, comprising the steps: capturing a speed of the motor vehicle, capturing a position of a speed controller, capturing an acceleration of the speed controller, comparing the captured values with predetermined reference values in the electronic control device for determining a shifting time, in particular of a shifting time for downshifting the automatic transmission, shifting, in particular downshifting the automatic transmission corresponding to a gear changed assigned to the reference value concerned.

Through the method it is possible that for example at a low or constant acceleration of the speed controller a shifting time can be determined, at which for example gears can be changed one after the other, while for example upon a high acceleration of the speed controller, a shifting time with an associated gear change can be determined, wherein a plurality of gears can be skipped, wherein for example at least one or a plurality of gears can be skipped.

The method the vehicle speed is preferably captured by way of at least one speed sensor. Because of this, the electronic control device can capture the speed of the motor vehicle and as a function of the position of the speed controller and the acceleration of the speed controller through comparison with predetermined reference values, determine a shifting time, in particular a shifting time for downshifting the automatic transmission, thus increasing the driving comfort.

With the method, the position of the speed controller can be preferentially captured by way of at least one angle sensor. The angle sensor can for example output a percentage value to the electronic control device. A value of approximately 0% can correspond to a zero position and a value of approximately 100% to a full load position of the speed controller. Because of this, the electronic control device can capture the position of the speed controller and as a function of the vehicle speed and the acceleration of the speed controller through comparison with a reference value determine a shifting time, in particular a shifting time for downshifting the automatic transmission, thus increasing the driving comfort.

It is preferred that with the method, the acceleration of the speed controller is captured by way of at least one acceleration sensor. The acceleration sensor can be arranged on the speed controller. Because of this, the electronic control device can capture the acceleration of the speed controller and as a function of the vehicle speed and the position of the speed controller through comparison with a reference value, determine a shifting time, in particular a shifting time for downshifting the automatic transmission, thus increasing the driving comfort. With the method, the electronic control device can preferably determine the acceleration of the speed controller as a function of the change of the position of the speed controller.

Because of this, the electronic control device can determine the acceleration with which the speed controller is actuated, for example with an increasing, constant or decreasing acceleration. As a function of the acceleration and/or position of the speed controller, the electronic control device can indirectly calculate and/or determine the acceleration and/or change of the position of the speed controller. In conjunction with the parameters vehicle speed and position of the speed controller and through comparison with a predetermined reference value, the electronic control device can determine a shifting time with an assigned gear change of the automatic transmission. Through the indirect capturing of the acceleration, the acceleration sensor can be saved. This can make cost savings possible.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or the following detailed description.

Figure 1:
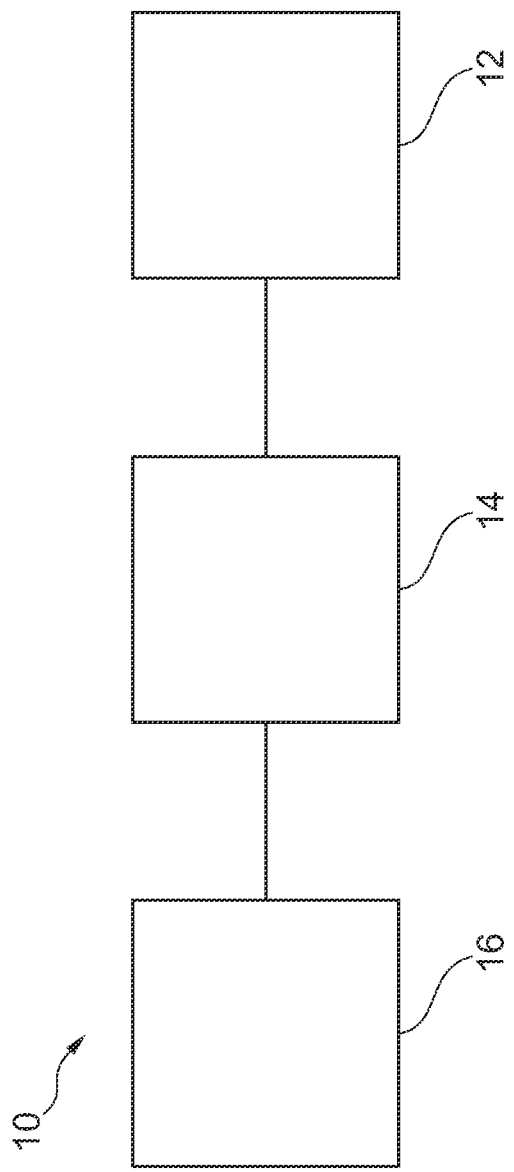
FIG. 1 is a simplified representation of an automatic transmission with a control system.

In FIG. 1, a simplified representation for a control system 10 for shifting, in particular for downshifting an automatic transmission 12 for a motor vehicle is shown. The control system 10 comprises an electronic control device 14, a speed controller 16. The electronic control device 14 is connected to the speed controller 16 and to the automatic transmission 12 for example in an electrically conductive manner for transmitting measurement values of parameters.

The electronic control device 14 can capture different parameters. The values of the parameters can be directly captured or indirectly captured through sensors connected to the electronic control device. The values with the indirect capture can be derived from additional information. The parameters in this case can comprise a vehicle speed, a position of the speed controller 16 and an acceleration of the speed controller 16. Here, the vehicle speed for example can be determined with a speed sensor or derived through the electronic control device 14 from information, for example from a rotational wheel speed. The position of the speed sensor can be captured for example with the help of an angle sensor. The angle sensor for example can output a discrete angular amount or a percentage value to the electronic control device 14. A value of approximately 0% can correspond to a zero position and a value of approximately 100% to a full load position of the speed controller 16. The acceleration of the speed controller 16 can be captured for example with an acceleration sensor arranged on the speed controller 16.

In the electronic control device 14, for example in a storage element integrated in the electronic control device 14, reference values for shifting times of the automatic transmission 12 with the assigned gear changes can be stored. The reference values can be assigned to certain gear changes, for example from the sixth into the fifth gear or from the fourth into the second gear. In the predetermined reference values for shifting the automatic transmission 12, in particular for downshifting, it can be determined by how many gears the automatic transmission 12 will shift. For example, at a low or constant acceleration of the speed controller 16, a shifting time, in particular a shifting time for downshifting the automatic transmission 12 can be determined, which engages the gears one after the other, while upon a high acceleration of the speed controller 16, a shifting time, in particular a shifting time for downshifting the automatic transmission 12 can be determined, which will skip a plurality of gears, wherein at least one or a plurality of gears can be skipped.

The captured values of the parameters can be continuously or discontinuously compared with predetermined reference values in the electronic control device for example as a function of a certain acceleration value of the speed controller 16. As soon as the captured values of the parameters coincide with one of the predetermined reference values, a value triple with a value of the position of the speed controller, a value for the acceleration of the speed controller as well as a value for the vehicle speed, the shifting time of the automatic transmission 12 can be determined through the electronic control device 14. The automatic transmission 12 can be shifted corresponding to a gear change assigned to the reference value concerned. Because of this, the control system can also skip gears during shifting, in particular during downshifting an automatic transmission, as a result of which an uneven for example a nervous or aggressive shifting behavior can be avoided.

Figure 2:
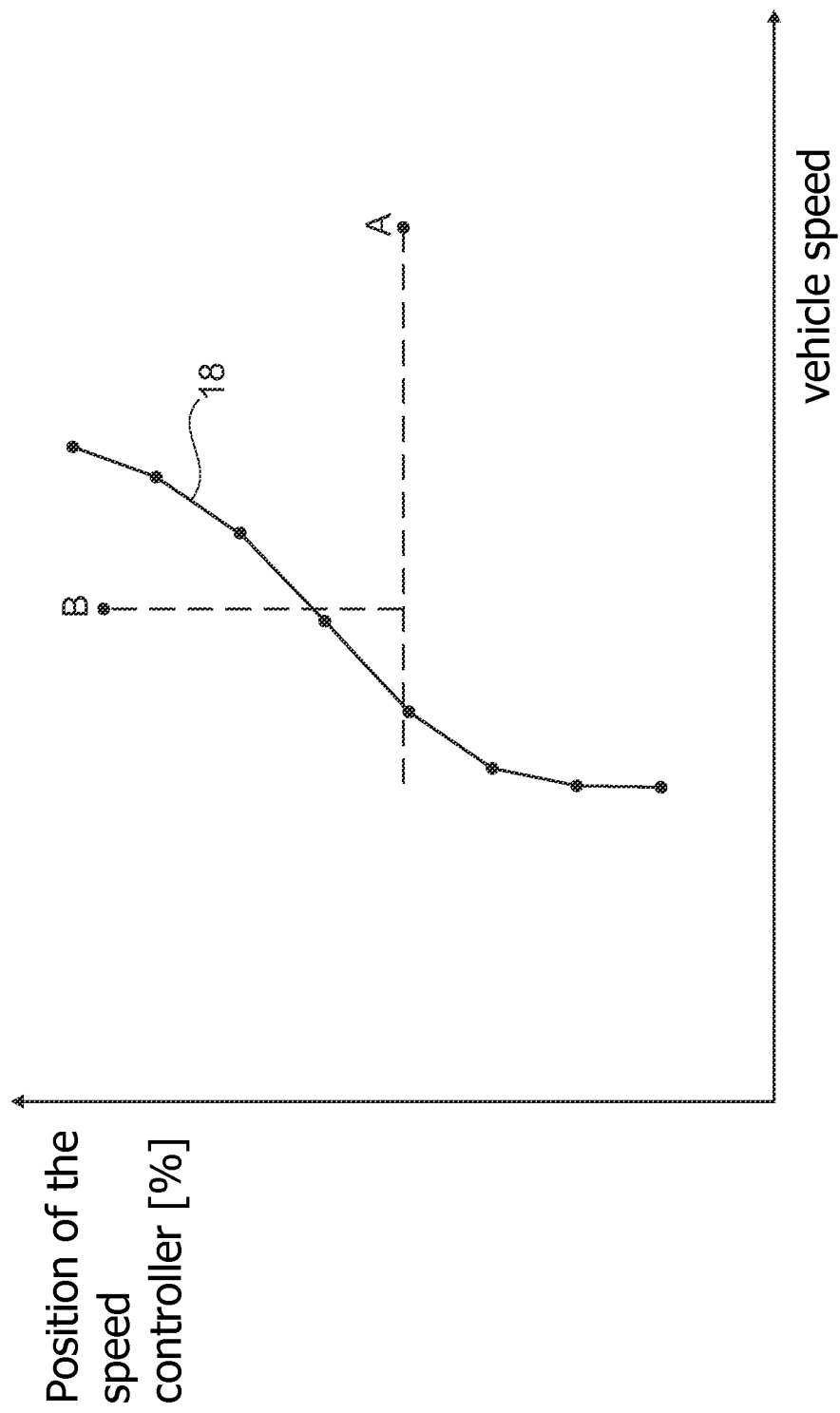
FIG. 2 is a shifting curve as a function of the position of a speed controller and of a vehicle speed.

In FIG. 2, a shifting curve 18, in particular a shifting curve 18 for downshifting an automatic transmission 12 for a motor vehicle (not shown) is shown, wherein the shifting curve 18 is assigned to a certain gear change, for example the gear change from a second into a first gear during a downshifting, as a function of the vehicle speed and the position of the speed controller 16. The individual points of the shifting curve in this case constitute value pairs, by means of which the shifting curve is described. The value pairs of the shifting curve 18 can be stored as reference value in a storage element of the electronic control device 14. The shifting curve 18 can be used in an electronic control device 14 in order to actuate the automatic transmission 12 of the motor vehicle. On the y-axis, which is designated 'position of the speed controller', the position of the speed controller 16 in % is stated, where at approximately 0% the speed controller 16 is in a rest position and at approximately 100% the speed controller 16 is completely actuated. The value approximately 0% designates the origin of the y-axis. On the x-axis, which is designated 'vehicle speed'; the speed of the vehicle is indicated. The position of the speed controller 16 in this case can be captured via an angle sensor and the vehicle speed can be captured with the help of a speed sensor.

A gear change of the automatic transmission 12 with the shifting curve exemplarily shown in FIG. 2 is explained in more detail in the following. A gear change takes place when the shifting curve is intersected by values of the x and y-axis. For example, both the position of the speed controller 16 as well as the vehicle speed has a value of the point A. With a constant position of the speed controller 16, the motor vehicle travels with a constant speed. As soon as the vehicle speed changes, for example when the vehicle travels uphill, and the driver does not change the position of the speed controller 16, the vehicle speed changes simultaneously and the value of the vehicle speed migrates along the interrupted line in the direction of the y-axis. The electronic control device 14 captures the position of the speed controller 16 and the reduction of the vehicle speed. As soon as the value of the vehicle speed intersects the shifting curve 18 without the position of the speed controller 16 changing, a shifting operation for downshifting the automatic transmission 12 is triggered by the electronic control device 14.

In a further example, the position of the speed controller 16 changes and the vehicle speed remains constant. For example, both the vehicle speed as well as the position of the speed controller 16 has a value of the point B. As soon as the driver changes the position of the speed controller 16 without changing the vehicle speed, for example when rolling downhill, the value of the position of the speed controller 16 migrates along the interrupted line towards the x-axis. As soon as the shifting curve is intersected, the shifting curve is exceeded and a shifting operation for downshifting the automatic transmission 12 is triggered by the electronic control device 14.

However, when using such shifting curves for a gear change in an automatic transmission 12, skipping gears is not possible. For example, when downshifting from the eighth gear into the fifth gear, the automatic transmission 12 has to individually downshift all gears from the eighth gear to the fifth gear one after the other. This results in an uneven, for example in a nervous or aggressive shifting behavior of the automatic transmission, which can manifest itself through a jerking of the motor vehicle or through a loud revving up of the engine.

Figure 3:
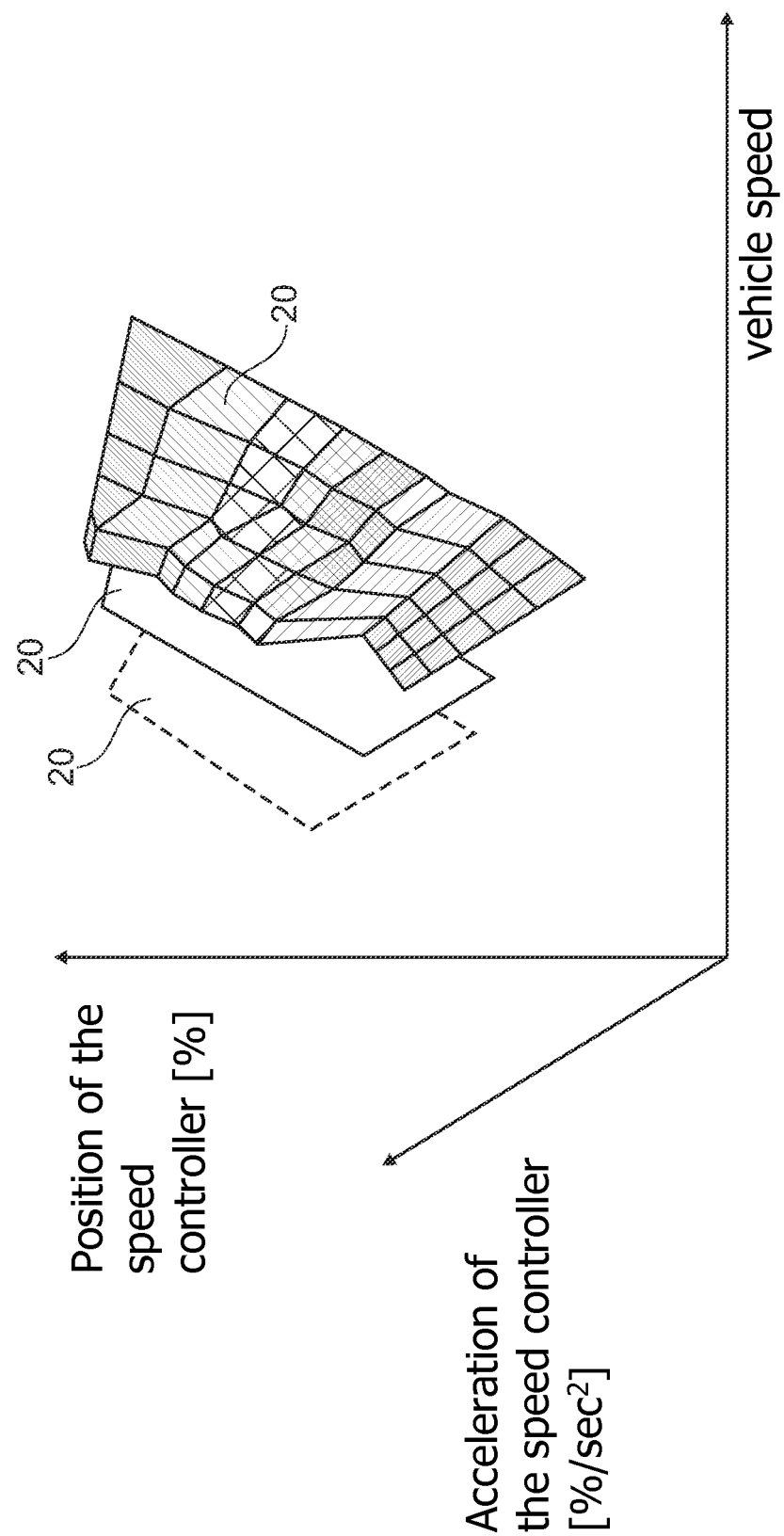
FIG. 3 is a plurality of shifting areas as a function of the position and of the acceleration of the speed controller and of the vehicle speed.

FIG. 3 shows a three-dimensional shifting space for an automatic transmission 12 for a motor vehicle defined by the parameters vehicle speed, position of the speed controller 16 and acceleration of the speed controller 16. The shifting space shown in FIG. 3 is used in an electronic control device 14 in order to actuate the automatic transmission 12 of the motor vehicle. The vehicle speed can be captured with a speed sensor. The position of the speed controller 16 can be captured with an angle sensor. The acceleration of the speed controller 16 can be captured by way of an acceleration sensor. However, it is also possible that the electronic control device 14 derives the acceleration of the speed controller 16 as a function of the change of the position of the speed controller 16.

In the defined three-dimensional shifting space, the position of the speed controller 16 in % is indicated on the y-axis, which is designated 'position of the speed controller', where a value of approximately 0% can correspond to a zero position and a value of approximately 100% to a full load position of the speed controller 16. On the x-axis, which is designated 'vehicle speed', the vehicle speed is indicated. On the z-axis, which is designated 'acceleration of the speed controller'; the speed of the change of the position of the speed controller 16 in % per second is stated.

The predetermined reference values for shifting times with the respective assigned gear changes, in particular the shifting times for downshifting the automatic transmission 12 can form a shifting area 20 in the x, y and z-plane. Each gear change can be assigned a shifting area 20, wherein the shifting areas 20 partially coincide, meaning being at least partially formed from the same value triple. This is the case for example upon a gear change wherein a gear is skipped.

In the shifting areas, the shifting behavior, in particular the shifting behavior for downshifting the automatic transmission 12 can be stored. For example it can be possible that at a low or constant acceleration of the speed controller 16, the captured values of the parameters can intersect a shifting area 20 of the predetermined reference values, in which a shifting time, in particular a shifting time for downshifting the automatic transmission can be determined, in which for example the gears can be shifted one after the other. Upon a high acceleration of the speed controller 16, the captured values of the parameters can intersect a shifting area 20 of the predetermined reference values in which the gears can be skipped, wherein at least two gears can be skipped as the gear before the shifting.

In FIG. 3, three different shifting areas 20 are exemplarily shown. The shifting areas 20 each are formed from reference values of value triples. Each reference value is assigned a certain gear change. The shifting areas 20 are arranged in the shifting space defined from the parameters position of the speed controller 16, acceleration of the speed controller 16 and vehicle speed. As soon as the captured parameters, in particular the captured value triples, coincide with one of the shifting areas 20, a corresponding shifting time with an associated gear change can be determined by the electronic control device 14.

A shifting, in particular a downshifting of the automatic transmission 12 can take place for example as follows: the electronic control device 14 can capture the vehicle speed, the position of the speed controller 16 and the acceleration of the speed controller 16, for example with the help of sensors. In the shifting space, the captured parameters can for example define a first point (not shown) corresponding to the parameter values. The electronic control device 14 continuously monitors the vehicle speed, the position of the speed controller 16 and the acceleration of the speed controller 16. As soon as for example the vehicle speed changes through a change of the position of the speed controller 16, the electronic control device 14 captures these changes and simultaneously captures the acceleration of the speed controller 16 in order to capture the speed of the change of the position of the speed controller 16. Because of this, the value triple of the parameters changes its position in the shifting space. The parameter values migrate from the first point through the shifting space as far as to a second point (not shown). The second point in the shifting space corresponds to the parameter values of the changed vehicle speed, the changed position of the speed controller 16 and the acceleration of the speed controller 16. The electronic control device 14 continuously compares the values of the vehicle speed, position of the speed controller 16 and the acceleration of the speed controller 16 with the predetermined reference values during the migration from the first point through the shifting space up to the reaching of the second point. As soon as the parameter values on the route to the second point intersect a shifting area corresponding to the predetermined reference values, a shifting time, in particular a shifting time for downshifting the automatic transmission 12 is reached. The automatic transmission 12 can be shifted with the assigned gear change. The shifting time determined by the electronic control device 14 can for example comprise a delay time. The automatic transmission 12 upon coinciding of the measured parameters with the reference values is only shifted with an assigned gear change upon a determined time delay.

For example, with a low or constant acceleration of the speed controller 16, a shifting time, in particular a shifting time for downshifting the automatic transmission 12 can be determined, which engages the gear one after the other, while with a high acceleration of the speed controller 16, for example a shifting time, in particular a shifting time for downshifting of the automatic transmission 12 can be determined, which can skip a plurality of gears.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A control system for shifting an automatic transmission of a motor vehicle, comprising:
   a speed controller; and
   an electronic control device that is configured to:
   capture a vehicle speed, a position of the speed controller, and an accelerator of the speed controller;
   compare the vehicle speed, the position of the speed controller, and the accelerator of the speed controller with predetermined reference values a shifting time; and
   determine the shifting time for downshifting the automatic transmission from the compare of the vehicle speed, the position of the speed controller, and the accelerator of the speed controller with the predetermined reference values.

2. The control system according to claim 1, wherein the electronic control device is further configured to determine an acceleration of the speed controller as a function of a change of the position of the speed controller.

3. The control system according to claim 1, wherein the shifting is a downshifting.

4. A method for controlling a shifting of an automatic transmission of a motor vehicle, comprising:
   capturing a speed of the motor vehicle with speed sensor;
   capturing a position of a speed controller;
   capturing an acceleration of the speed controller;
   comparing by a processor the speed, the position, and the acceleration with predetermined reference values in an electronic control device;
   determining by a processor a shifting time for the automatic transmission based on the comparing; and
   shifting corresponding to the shifting time.

5. The method according to claim 4, wherein the shifting is a downshifting.

6. The method according to claim 4, wherein the speed sensor is an angle sensor.

7. The method according to claim 4, wherein the capturing the acceleration of the speed controller is captured via at least one acceleration sensor.

8. The method according to claim 4, further comprising determining the acceleration of the speed controller as a function of a change of the position of the speed controller.

* * * * *